Jan. 3, 1967 R. L. DALTON 3,296,590
TIRE PRESSURE INDICATOR
Filed Aug. 1, 1963 2 Sheets-Sheet 1

INVENTOR.
ROBERT L. DALTON
BY
Attorney

United States Patent Office 3,296,590
Patented Jan. 3, 1967

3,296,590
TIRE PRESSURE INDICATOR
Robert L. Dalton, Pittsford, N.Y., assignor to R. D. Products, Incorporated, East Rochester, N.Y., a corporation of New York
Filed Aug. 1, 1963, Ser. No. 299,229
9 Claims. (Cl. 340—58)

This invention relates to a device for detecting leaks in pneumatic tires, and more particularly to a pressure-responsive device for warning a truck driver of the existence of an undesirable low pressure condition in one of the dual tires of his truck.

On trucks, truck-tractors, and trailers which have axles equipped with dual tires, it is extremely difficult to judge visually whether or not the tires are inflated to the proper pressure. However, if one of a pair of dual tires should begin to leak and lose pressure, the other tire of the pair will have to assume the load normally supported by the two together. If this continues for any length of time irreparable damage may be done to the other tire.

While a careful driver will usually check his tires at all service or refueling stops, modern trucks have an operating range of several hundred miles and leaks usually develop during operation, so that by the time a service station is reached and the tire pressures are checked the damage may have been done. Moreover, because it is extremely difficult to change or repair a leaking dual tire, the driver may decide to take a chance on a leak until he gets to the next service station; and the leak may be greater than he estimates with the result that before the service station is reached the leaking tire will have collapsed, and the damage will be done. It is desirable, therefore, that the driver not only have some means for warning him of a leak in a tire but also for determining how critical the leak happens to be, so that he may decide whether or not he should continue driving the truck to the nearest service station, or stop immediately to prevent excessive damage to the tire.

One object of this invention is to provide a device for warning the operator of an automotive vehicle of a leaking tire.

Another object of this invention is to provide a pressure indicator which will signal promptly when the pressure in the tire of an automotive vehicle falls below a predetermined value.

A further object of this invention is to provide a warning system of the type described, which will indicate the rate at which air is leaking from a tire.

A more specific object of this invention is to provide a device for continuously checking the air pressure in the tires of an automotive vehicle, and for warning the vehicle operator if the pressure in a tire falls below a predetermined level.

Other objects of the invention will be apparent hereinafter from the specification and from the appended claims, particularly when read in conjunction with the accompanying drawings.

Figure 3:
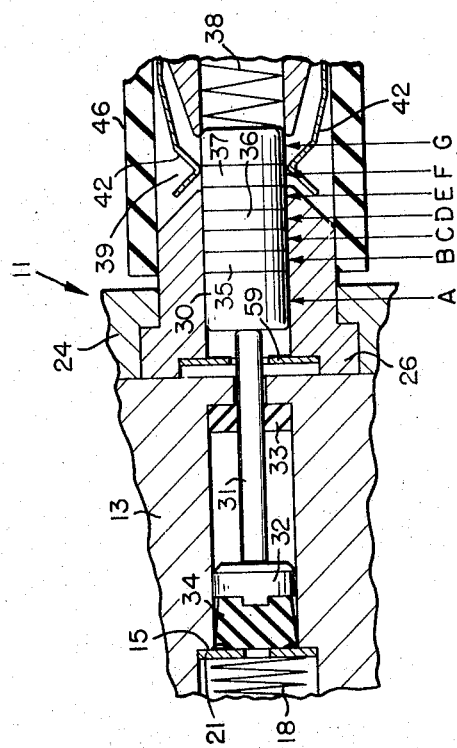
FIG. 3 is a fragmentary view of the switch showing the switch actuating plunger disposed in a different position, and indicating diagrammatically the different stages at which the warning system is actuated during loss of air pressure in a tire.

Referring now to the drawings by numerals of reference, 11 designates generally a pressure-responsive switch built in accordance to this invention and removably connected to the terminal end of a valve stem 12 of a conventional truck tire for actuating a signal system to indicate drop in pressure in the tire. Switch 11 comprises a sleeve 13 which is internally threaded at one end, as denoted at 14, to thread onto the externally threaded valve stem 12. Beyond the threaded portion 14, the sleeve 13 is counterbored to form an internal shoulder 15 (FIGS. 1 and 3).

Mounted in the sleeve 13 is a cap or washer 16 having a protruding central portion 17 which is held by a coil spring 18 against the head of the valve 19 of the tire under a sufficient pressure to depress the valve and hold it open. The spring 18 is interposed between the cap and an annular washer 21 which is seated against the shoulder 15. A resilient, annular rubber gasket 22 is interposed between the washer 16 and the valve stem 12 to seal one relative to the other and prevent leakage.

The spring 18 keeps pressure through washer 16 on the rubber gasket 22. The resiliency of the spring, even though it be compressed fully, when the sleeve 13 is threaded onto the valve stem 12, prevents the gasket 22 from taking a set, which would cause it to leak.

Figure 1:
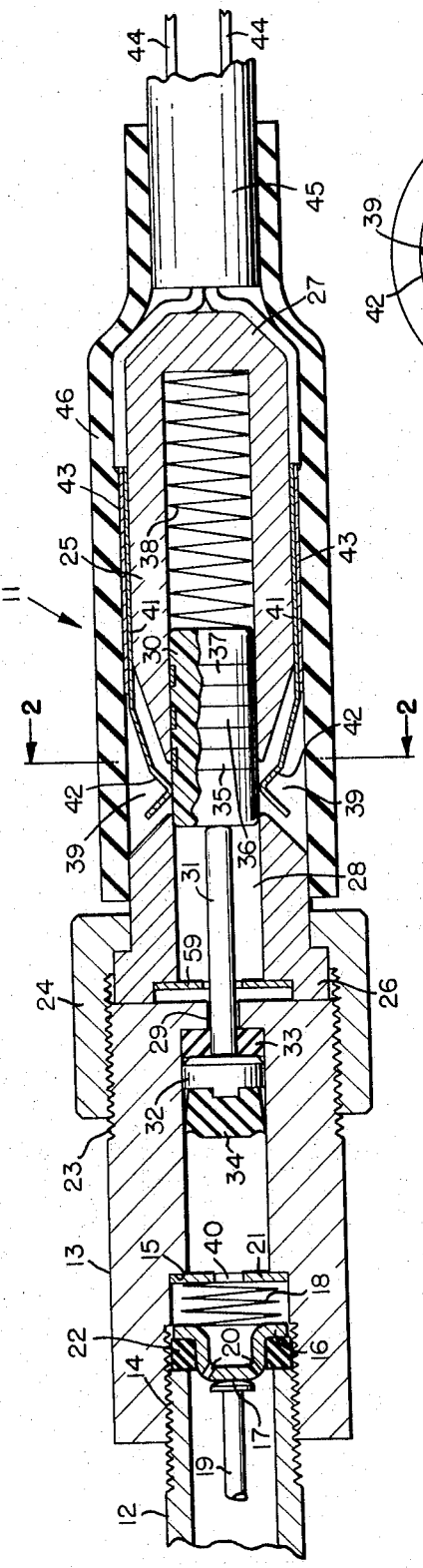
FIG. 1 is a fragmentary, longitudinal sectional view through a pressure-responsive switch forming part of and actuating a warning system made in accordance with one embodiment of this invention.
Figure 2:
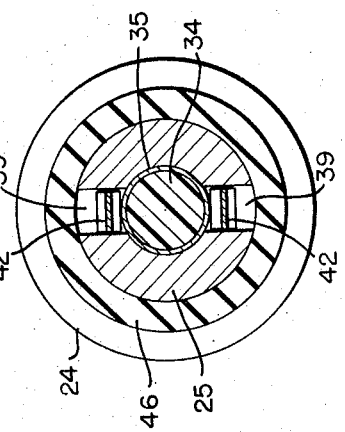
FIG. 2 is a cross sectional view of this switch taken along the line 2—2 in FIG. 1, and looking in the direction of the arrows.

The washer 16 has therethrough a plurality of ports 20 (two of which are shown in FIG. 1).

At its opposite end the sleeve 13 is externally threaded as at 23. Removably coupled to the threaded end 23 of the sleeve by means of a nut 24 is a cylinder 25. Cylinder 25 is closed at its outer end 27 and is open at its inner end 26 and is sealingly secured by the nut 24 against the outer face of the sleeve 13 coaxially thereof.

Reciprocable in the bore 28 of cylinder 25 is a piston 30 which is formed with a rod portion 31 that extends through a central opening 29 in the outer end of the sleeve 13 and that is formed with an enlarged head or piston portion 32. Interposed between the confronting faces of the piston 32 and of the sleeve 13 is a gasket 33; and secured to the face of the piston 32 for sliding movement therewith is a resilient gasket 34.

The piston 30 is made of plastic and is therefore an electric insulator. Secured in three axially spaced, circumferential recesses in the piston 30 are, however, three annular brass bands 35, 36 and 37. The outer surfaces of the bands 35, 36 and 37 may be chrome plated, and each has an outside diameter substantially equal to the outside diameter of the piston 30.

Mounted in the bore 28 of the cylinder 25 between the piston 30 and the closed end 27 of the cylinder is a coil spring 38 which constantly urges the piston 30 toward the open end of cylinder 25, or toward the left in FIG. 1.

Intermediate its ends the cylinder 25 has therethrough two diametrally opposite openings 39. Secured at one end to the outer peripheral surface of the cylinder 25 adjacent each opening 39 is a metallic blade or electrical contact member 41. Each of the contact members 41 is bent or crimped to form a contact 42, which projects radially inwardly through a respective opening 39 in the cylinder 25, resiliently to engage and ride on the outer peripheral surface of the piston 30 as shown in FIG. 1.

Soldered to the blades 41 are the bare ends 43 of two insulated wire leads 44. The wire leads 44 pass about the closed end 27 of the cylinder 25 and into a conventional, flexible insulating sleeve 45. The contacts 42 and bare ends 43 of the leads 44 are covered by a rubber insulating sleeve 46 which also covers the inner end of insulating sleeve 45.

In use, a switch 11 is secured to the valve stem of each tire T (FIG. 4) of a dual tire pair; and the switches are employed to control the operation of a conventional, low powered radio wave transmitter 47 (FIGS. 4 and 5), which is secured by an eyebolt 48 and nut 49 to the annular spacer rim 51 that is normally secured between the wheels 52 of a conventional, dual tire and wheel assembly. The eyebolt 48 is electrically insulated from the rim 51 by a rubber grommet 53 which surrounds the head of the eyebolt and the adjacent part of the bolt shank which passes through a hole in rim 51. An antenna 54, in the form of an arcuate rod, passes through the head of the eyebolt 48, and adjacent opposite ends thereof is held in electrically-insulating rubber grommets 55 secured to the outer surface of the rim 51. The transmitter 47 is connected in conventional manner to the antenna 54 by a wire which is not illustrated.

The antenna 54 is an important feature of the invention. Heretofore radio transmitters and antennae have been secured on the inside of the wheels, mounted inside the rims. These do not work without very large and powerful transmitters to force the signals through the wheels, so that they are impractical for trucks. By putting the transmitter and antenna on the spacer rim, however, the antenna is relatively clear of interference so that a smaller power transmitter is practical. At the same time the antenna is protected from rocks, etc. The antenna has to be insulated from the rim because the rim is grounded to the truck.

Figure 4:
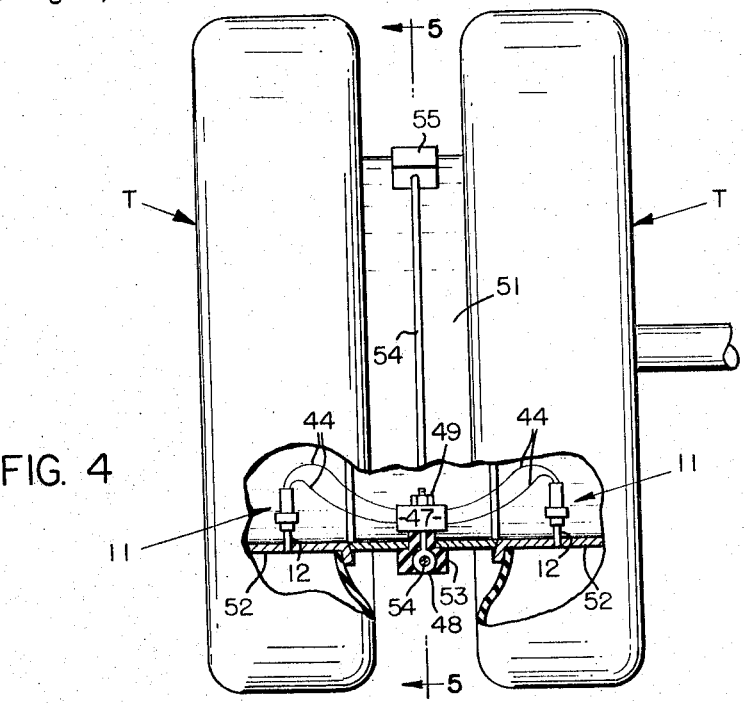
FIG. 4 is an elevational view of a dual tire and wheel assembly on which a pressure-responsive switch and transmitter built according to one embodiment of this invention have been mounted, the view being cut away in part.
Figure 5:
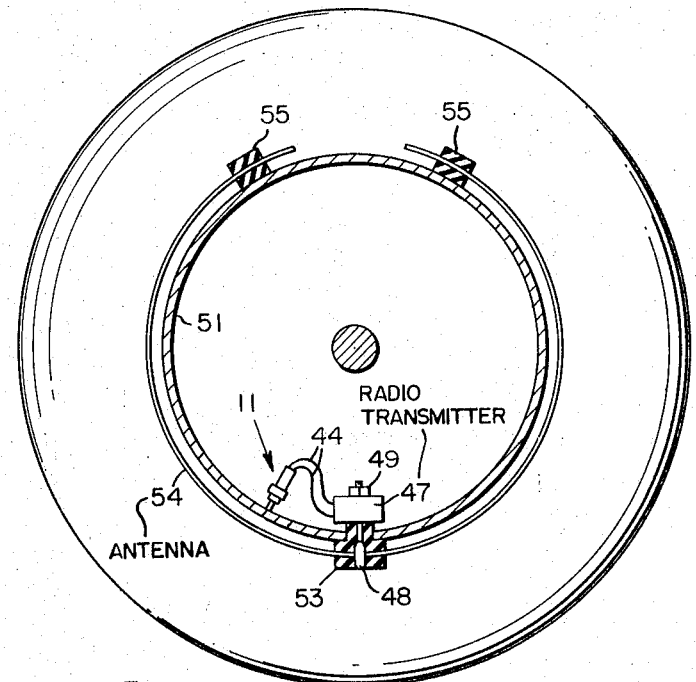
FIG. 5 is a sectional view taken along the line 5—5 in FIG. 4 and looking in the direction of the arrows.

After the switches 11 have been secured to the valve stems 12 as shown in FIGS. 3 and 4, the leads 44 therefrom are connected in parallel in the operating circuit of the transmitter 47 so that the latter will be energized whenever the contacts 42 of either switch engage either of the brass bands 35, 36 or 37 carried by the associated piston 30.

Assuming that each of the tires in the assembly is a truck tire, which, under normal conditions, is inflated to a pressure of say 80 pounds per square inch, the pressure of the air in a respective tire, acting through the ports 20 in cap 16 and the hole 40 in washer 21 will cause piston 32 to be shifted against the resistance of spring 38 to its extreme right hand position as illustrated in FIG. 1, whereby the contacts 42 will engage the plastic surface of the corresponding piston 30 in zone A (FIG. 3), which is to the left of its band 35. The switches 11 are therefore in non-conducting positions, so that they open the circuit which controls the operation of the transmitter 47, thereby preventing the latter from transmitting any signals.

If, however, the air pressure in either tire falls to say 70 pounds per square inch, the force of the spring 38 acting on the right end of the piston 30 of the switch 11 associated with the leaking tire will overcome the pressure of the air on the inner face of gasket 34, and the piston 30 will be shifted (to zone B) axially to the left in FIG. 1 so that the band 35 will engage the contacts 42. The operating circuit of the transmitter 47 is thus actuated so that it emits a signal which may be picked up by a conventional receiver (not illustrated) mounted in the cab of the truck. The receiver will in turn emit an audible signal to warn the driver of the loss of pressure in the tire.

If air continues to leak from the tire, the spring 38 in the associated switch 11 will force the piston 30 further to the left in FIG. 1 (to zone C) until its band 35 disengages the associated switch contacts 42 thereby silencing the transmitter 47 and the signal it produces. However, if the tire continues to leak, the piston 30 will be shifted even further to the left in FIG. 1 so that its band 36 (zone D in FIG. 3) engages with the associated switch contacts 42, thereby once again actuating the transmitter 47 and the warning receiver in the truck cab. The receiver will then emit a signal until the pressure in the tire falls far enough for the non-conducting zone E (FIG. 5) of the piston 30 to engage the contacts 42, thereby once again interrupting the operation of the transmitter 47. If the pressure in the tire still continues to fall, one further warning signal is given in zone F (FIG. 3) of the block when the band 37 engages contacts 42. At this point the gasket 34 is in engagement with the washer 21 and the piston 30 cannot go any further to the left. The result is that the last warning signal remains on until the driver backs off the nut 24. Then the piston 30 can move further to the left until the left hand end of zone A engages the internal retainer ring 59. Then the non-conducting zone G (FIG. 3) of the piston 30 engages contacts 42, and the signal will be terminated. At this time the tire is, in essence, completely flat, and no warning signal is being emitted from the receiver in the cab of the vehicle.

By having the piston 30 stop normally in its leftward movement when zone F contacts the blades 42, insurance is had that, should a tire go flat while the driver is away from his vehicle, as for instance overnight or when he goes to a restaurant or a rest room, he will be warned by the signal, upon his return, of the condition of the tire. When the device is being shipped the contact 42 will automatically engage zone G by action of spring 38 so that there will be no signal during shipment. By backing the nut 24 off when the device is on a vehicle, the driver can check to see if the device is operating properly.

Bands 35, 36 and 37 may be spaced so that they denote, respectively, when the pressure in the tire has fallen to 70 pounds, to 50 pounds, and to 30 pounds, respectively, or to any amounts desired.

The advantage of employing a plurality of axially spaced bands 35, 36 and 37 to form the zones A to G is that the driver will be given some indication of the seriousness of the leak in a tire. For instance, without having to get out of the vehicle and check the tire pressure with a conventional, manually operable gauge, the driver can pretty well approximate the amount of air remaining in a tire, and the rate at which it is leaking from the tire, merely by noting the period of time which elapses between the initial sounding of the warning device and the time of the second signal. If there is considerable interval between the two signals, he will know that the leak is slow enough to warrant his continuing on until he finds a service station, or until such time as the second and third signal warnings, caused by the engagement of the contacts 42 with the bands 36 and 37, respectively, occur and indicate that the pressure in the tire is reaching a dangerously low point. On the other hand, if there is only a brief interval between the first and second signals the driver will know that there must be a bad puncture in the tire.

From the foregoing it will be apparent that applicant has provided a relatively simple and reliable warning system which is constantly ready to alert the driver of a vehicle to the danger of a leaking or low pressure condition in his tires. There have been some prior systems proposed to warn a driver against leakage in tires, in which an electrical transmitter actuated by leakage in a tire operated electrically through a wired connection to actuate a signaling device in the cab of the truck or tractor. Difficulties have been encountered with such systems, however, because of the problems of maintaining an electrical connection between the transmitter and the signal-emitter. Whether the transmitter be mounted to rotate with the wheels, or be mounted on an axle, a commutator or some similar means must be employed to maintain the electrical connection. By using a radio transmitter operated by tire pressure and a radio receiver in the cab for operating the signal applicant avoids the drawbacks of the previously known electric system. By mounting his transmitter between the dual wheels, moreover, the transmitter is protected from the elements. Furthermore, by providing a device which transmits successive warning signals at intervals as the pressure in a leaking tire decreases, applicant has provided a ready means for indicating the nature and relative danger of a leak without requiring any manual measurements of the tire pressure on the part of the driver.

The device can operate with two electrically conductive bands on the piston 30, instead of the three shown. The third band 37 merely operates as an additional safety means to warn a driver, who is inclined to take a chance, that it is risky to drive further.

While the invention is described as being particularly adaptable for use in conjunction with truck tires, it is to be understood that it could be made to work equally well for conventional automobile tires. Also, although only three axially spaced switch operating bands 35, 36 and 37 have been described, it is, of course, apparent that the number of bands may be increased or decreased to vary, accordingly, the number of intermittent signals that are given as the air leaks from a tire. Moreover, where a plurality of transmitters are employed, they may be selected to operate at different frequencies, so that the location of the leaking tire may be more readily pinpointed.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A device for indicating a low pressure condition in a pneumatic tire, comprising
   (a) a stationary member and a member movable relative to said stationary member,
   (b) means for connecting said movable member to a pneumatic tire for movement in one direction in response to a decrease in the air pressure in said tire,
   (c) a pair of normally open switch contacts carried by one of said members,
   (d) electrically-operated means connected to said normally open switch contacts and operative upon the closing of said contacts to generate a warning signal, and
   (e) contact means on the other of said members spaced from one another in said one direction and operative intermittently to close said normally open contacts successively upon movement of said movable member in said one direction.

2. A device for indicating a low pressure condition in a pneumatic tire comprising
   (a) a sleeve adapted to be sealingly connected at one end to the valve stem of a pneumatic tire to contain air from said tire at the pressure in said tire,
   (b) a switch housing coupled to the opposite end of said sleeve and having an axial bore,
   (c) a reciprocable member slidably mounted in the bore in said housing,
   (d) means for admitting air into the bore of said sleeve from the valve stem to which said sleeve is connected thereby to effect movement of said member in response to changes in the air pressure in said sleeve, and
   (e) a normally open switch carried by said housing and intermittently movable to its closed position by said reciprocable member upon movement of said member,
   (f) said switch being operatively connected to warning means for operation of said warning means when said switch is closed, and
   (g) said reciprocable member, each time it closes said switch, being operative to maintain said switch in its closed position for a period of time proportional to the rate at which said member is moving in said housing bore.

3. A device as claimed in claim 1 for indicating a low pressure condition in a tire on a vehicle of the type having a dual tire and wheel assembly, wherein said electrically-operated means comprises
   (a) a radio wave transmitter for transmitting a warning signal to a receiver mounted on the vehicle,
   (b) means mounting said transmitter on an annular spacer rim secured between the wheels of the tire and wheel assembly for rotation with the assembly, and
   (c) an antenna mounted on said spacer rim in insulated relation thereto to extend substantially completely around said rim in radially spaced coaxial relation thereto, and connected to said transmitter.

4. A device for indicating a low pressure condition in a tire on a vehicle of the type including a dual tire and wheel assembly, comprising
   (a) a radio wave transmitter for transmitting a warning signal to a receiver mounted in the cab of a vehicle,
   (b) means mounting said transmitter on an annular spacer rim secured between the wheels of a rotatable dual tire and wheel assembly on said vehicle for rotation with the assembly,
   (c) an antenna mounted on said spacer rim and connected to said transmitter,
   (d) a pressure-responsive switch connected in the operating circuit of said transmitter and operable to actuate same, and
   (e) means connecting said switch to the valve stem of one of the tires in said assembly for operation upon a predetermined decrease in the pressure of the air in said one tire,
   (f) said mounting means comprising an eye bolt securing said transmitter to the inner peripheral surface of said rim, with the head of said bolt projecting from the outer peripheral surface of said rim, and
   (g) said antenna comprising an arcuate rod passing through the eye in the head of said bolt and secured in radially spaced coaxial relation to said outer peripheral surface of said rim.

5. Signalling means for indicating the pressure in a pneumatic tire, comprising
   (a) a housing sealingly connected to the tire to receive air from the tire at the same pressure as in the tire,
   (b) a member in said housing and movable therein in one direction by the pressure of air in said tire,
   (c) means resiliently urging said member in the opposite direction, and
   (d) a plurality of switch-operating members mounted on said movable member and spaced from one another in the direction of movement of said movable member, and
   (e) a switch mounted on said housing in position to be operated by said switch-operating members as they pass said switch,
   (f) said switch being wired in the circuit of an electrically-operated signalling device.

6. Signalling means for indicating pressure in a pneumatic tire, comprising
   (a) a housing sealingly connected to the valve stem of the tire to receive air from the tire at the same pressure as in the tire, (b) a cap member mounted in said housing to engage the valve of the tire, (c) spring means for pressing said cap member in a direction to open said valve to permit air to flow from the tire into said housing, (d) said cap having openings therethrough through which the air can flow from the tire into said housing when the valve is open, (e) sealing means interposed between said cap member and the valve stem to prevent leakage of air around said valve stem into said housing, (f) a piston reciprocable in said housing, (g) said piston being mounted to be movable in one direction in said housing under pressure of the air from the tire, (h) spring means for urging the piston in the other direction, (i) said piston having a plurality of electrically conductive portions spaced therealong in the direction of movement of the piston and alternating with electrically non-conductive portions, (j) an electric contact member mounted in said housing in position to engage said conductive portions successively as said piston moves in said opposite directions, (k) said electric contact member being wired to a signalling device to turn the same on and off upon engagement with the electrically conductive and non-conductive portions of the piston.

7. A device for indicating a low pressure condition in a pneumatic tire, comprising (a) a switch connected in the operating circuit of an electrically-operated signalling means, (b) a housing, (c) a member movable in a bore in said housing, (d) means for mounting said housing on the valve stem of a pneumatic tire with the bore of said housing in communication with the interior of said tire and said movable member dipsosed to move relative to said housing upon a change of air pressure in said tire, and (e) spaced means on said movable member operative upon the movement of said member a predetermined distance in one direction to effect intermittent operation of said switch, (f) said mounting means including means operative, upon the mounting of said housing on said stem, to move said member into a position in which one of said spaced means effects the operation of said switch, when there is no air pressure in said tire.

8. A device for indicating a low pressure condition in a tire, comprising (a) a normally open switch connected in the operating circuit of an electrically-operated signalling means, (b) a housing, (c) a movable member mounted in the bore of said housing for movement between two limit positions, said switch being open when said movable member is in either of said two limit positions, (d) means for mounting said housing in operative and inoperative positions, respectively, on the valve stem of a pneumatic tire with the bore of said housing in communication with the interior of said tire, and with said movable member disposed to be moved toward one of its limit positions by the air pressure in said tire, (e) resilient means constantly urging said movable member toward the other of its limit positions, and (f) spaced means on said movable member operative to effect intermittent closing of said switch upon a predetermined movement of said member in one direction, said mounting means including (g) a limit member operative, when said housing is mounted in said operative position on said stem, to hold said movable member in a third position in which one of said spaced means will effect a closing of said switch, when the air pressure in said tire is zero.

9. A device as defined in claim 8 wherein (a) a portion of said movable member projects from one end of said housing, (b) said resilient means is a spring interposed between said movable means and said housing, and said mounting means further includes (c) a sleeve containing said limit member and adapted to be connected at one end to said valve stem, and (d) a manually adjustable coupling member for securing said one end of said housing selectively in said operative and inoperative positions on the opposite end of said sleeve with said projecting portion of said movable member urged by said spring into engagement with said limit member, (e) said spring being operative, when the air pressure in said tire is zero, to effect a shifting of said movable member from said third to said other of its limit positions, and to effect an opening of said switch, upon the adjustment of said housing into its inoperative position.

References Cited by the Examiner

UNITED STATES PATENTS

| | | | |
|---|---|---|---|
| 1,975,639 | 10/1934 | Greene | 200—61.25 |
| 2,309,025 | 1/1943 | Thorson | 340—58 X |
| 2,727,221 | 12/1955 | Sprigg | 340—58 |
| 2,860,321 | 11/1958 | Strickland et al. | 340—58 |
| 3,117,195 | 1/1964 | Woodfill et al. | 340—58 |
| 3,178,686 | 4/1965 | Mills | 340—58 |
| 3,181,118 | 4/1965 | Perry | 340—58 |

NEIL C. READ, *Primary Examiner.*

A. H. WARING, *Assistant Examiner.*